United States Patent
Karivaradaswamy

(10) Patent No.: US 10,742,955 B2
(45) Date of Patent: Aug. 11, 2020

(54) CORRELATION OF VIDEO STREAM FRAME TIMESTAMPS BASED ON A SYSTEM CLOCK

(71) Applicant: Microsoft Technology Licensing, LLC, Redmond, WA (US)

(72) Inventor: Sathyanarayanan Karivaradaswamy, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/990,549

(22) Filed: May 25, 2018

(65) Prior Publication Data

US 2019/0356897 A1 Nov. 21, 2019

Related U.S. Application Data

(60) Provisional application No. 62/674,599, filed on May 21, 2018.

(51) Int. Cl.
*H04N 13/167* (2018.01)
*H04N 13/139* (2018.01)
*H04N 5/08* (2006.01)

(52) U.S. Cl.
CPC ............. *H04N 13/167* (2018.05); *H04N 5/08* (2013.01); *H04N 13/139* (2018.05)

(58) Field of Classification Search
CPC .......... H04N 5/07; H04N 5/772; H04N 5/775; H04N 5/7755; H04N 5/76; H04N 5/3765
See application file for complete search history.

(56) References Cited

U.S. PATENT DOCUMENTS

| | | | |
|---|---|---|---|
| 5,640,388 A | 6/1997 | Woodhead et al. | |
| 6,081,299 A | 6/2000 | Kesselring | |
| 6,259,677 B1 | 7/2001 | Jain | |
| 6,647,504 B1 | 11/2003 | Van Paepegem | |
| 6,871,006 B1 * | 3/2005 | Oguz ................... | G11B 27/031 348/E7.073 |

(Continued)

OTHER PUBLICATIONS

Huang, Tuo, "GPUImage Video Merging: Timestamp Synchronization", Retrieved from<<http://tuohuang.info/gpuimage-video-merging-timestamp-synchronization#.WIW_4VVsYdW>>, Jan. 20, 2015, 6 Pages.

(Continued)

*Primary Examiner* — Clifford Hilaire

(57) ABSTRACT

The methods described herein are configured to correlate frames of a video stream to a system clock. A correlator application receives a frame of a video stream from a capture device via a bus interface, the frame including start frame and end frame timestamps based on a device clock of the capture device. A second start frame timestamp and second end frame timestamp are predicted based on previously received frames and a system clock. A skew value of the frame is calculated based on differences between the start frame timestamps and the end frame timestamps. Upon the calculated skew value exceeding a skew threshold, the frame is corrected to correlate to the predicted start frame and end frame timestamps. The corrected frame is then provided for display. Correcting timestamps of video stream frames in the described manner reduces jitter and enables accurate synchronization of multiple video streams.

20 Claims, 5 Drawing Sheets

(56) References Cited

U.S. PATENT DOCUMENTS

| | | | |
|---|---|---|---|
| 8,462,212 B1* | 6/2013 | Kundu | G07G 1/0081 |
| | | | 348/150 |
| 8,689,036 B2 | 4/2014 | Millington et al. | |
| 8,736,700 B2 | 5/2014 | Cote et al. | |
| 2005/0201399 A1* | 9/2005 | Woodward, Jr. | H04J 3/0632 |
| | | | 370/412 |
| 2010/0215057 A1 | 8/2010 | Frink et al. | |
| 2011/0228888 A1 | 9/2011 | Gelter et al. | |
| 2012/0081567 A1* | 4/2012 | Cote | H04N 21/41407 |
| | | | 348/222.1 |
| 2014/0173138 A1 | 6/2014 | Haba | |
| 2014/0266604 A1* | 9/2014 | Masood | G06K 9/00221 |
| | | | 340/5.83 |

OTHER PUBLICATIONS

Yang, et al., "Time Stamp Synchronization in Video Systems", In Proceedings of International Telemetering Conference, Oct. 1, 2010, pp. 1-8.

"International Search Report and Written Opinion Issued in PCT Application No. PCT/US2019/030792", dated Jun. 12, 2019, 12 Pages.

* cited by examiner

US 10,742,955 B2

CORRELATION OF VIDEO STREAM FRAME TIMESTAMPS BASED ON A SYSTEM CLOCK

CROSS-REFERENCE TO RELATED APPLICATION

The present application claims priority to U.S. provisional patent application Ser. No. 62/674,599, filed May 21, 2018, entitled "CORRELATION OF VIDEO STREAM FRAME TIMESTAMPS BASED ON A SYSTEM CLOCK", and hereby incorporated by reference herein in its entirety.

BACKGROUND

Modern video capture devices make use of a variety of different types of technologies for capturing, processing, and transmitting or otherwise transferring captured video data. A video capture device may be designed to capture primarily visible light video, depth-based video, infrared-based video, or a combination thereof. However, in some cases, the technologies used by video capture devices to process and/or transfer the captured video data limit the quality of the resulting video stream and/or negatively affect the user experience of watching the resulting video stream. Device clocks of video capture devices may drift, causing temporal distortion or "jitter" in the video stream, video processing operations may cause the video stream to skew out of sync, and/or a communication bus or other medium may provide less reliable data transfer than necessary to provide a high-quality video stream to users on the other end of the transfer. For example, use of universal serial bus (USB) technology to transfer frames of video stream may present a variety of challenges associated with accurate timing of the frames in the video stream after transfer.

These challenges are compounded when multiple video streams are combined to form three-dimensional video streams, video streams with multiple points of view, or the like. Synchronizing each video stream requires extremely accurate timing of each frame, and each video stream may be captured by different video capture devices, each with a unique set of technologies that must be considered in order for the video streams to be correlated to a shared timeframe. Providing combined video streams for viewing without significant temporal distortion, jitter, or other issues that cause a negative user experience is a challenging task.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method comprises receiving a frame of a video stream from a capture device via a bus interface, the frame including a first start frame timestamp and a first end frame timestamp based on a device clock associated with the capture device. A second start frame timestamp and a second end frame timestamp associated with the received frame are predicted based on a plurality of previously received frames of the video stream. The second start frame timestamp and second end frame timestamp are further based on a system clock associated with a display system. A skew value of the received frame is calculated based on a difference between the first start frame timestamp and the second start frame timestamp, and a difference between the first end frame timestamp and the second end frame timestamp. Upon the calculated skew value exceeding a skew threshold, the received frame is corrected to correlate to the second start frame timestamp and the second end frame timestamp. The corrected frame is then provided for display.

Many of the attendant features will be more readily appreciated as the same becomes better understood by reference to the following detailed description considered in connection with the accompanying drawings.

BRIEF DESCRIPTION OF THE DRAWINGS

Corresponding reference characters indicate corresponding parts throughout the drawings. In FIGS. 1 to 5, the systems are illustrated as schematic drawings. The drawings may not be to scale.

DETAILED DESCRIPTION

The systems and methods described herein are configured to correlate video stream frames received from video capture devices with a system clock of a receiving computing device and to provide the correlated video stream frames for display. The frames, including timestamps based on the device clock of the video capture device, are received by the computing device via a communication bus interface. The computing device predicts the expected timestamps of the received frame based on the system clock of the computing device and on the timestamps of previously received video stream frames. If a difference between the predicted timestamps and the timestamps received with the frame exceeds a defined skew threshold, the timestamps of the frame are corrected to correlate with the predicted timestamps. The correlated frame is then provided for display (e.g., via one or more user applications executing on the computing device).

Correlating and/or synchronizing frames as described herein is effective at eliminating significant differences in the timestamps of frames of one or more video streams, which reduces temporal distortion, smooths "jitter" of the video streams, and generally improves the user experience of viewing the video streams. In some examples, the operations for correlating the frames as described herein is an unconventional use of clocks, processors, memory, and other conventional computing resources. The accurate synchronization of multiple combined video streams provided by the described methods may be used to improve the quality of three-dimensional video streams and/or other types of video streams that rely on the use of multiple video stream inputs. Further, the performance of USB and other similar bus technology as communication media for high-quality live video streams is enhanced through use of the described systems and methods. In this manner, the disclosure improves the functioning of the computing device performing operations as described herein.

Figure 1:
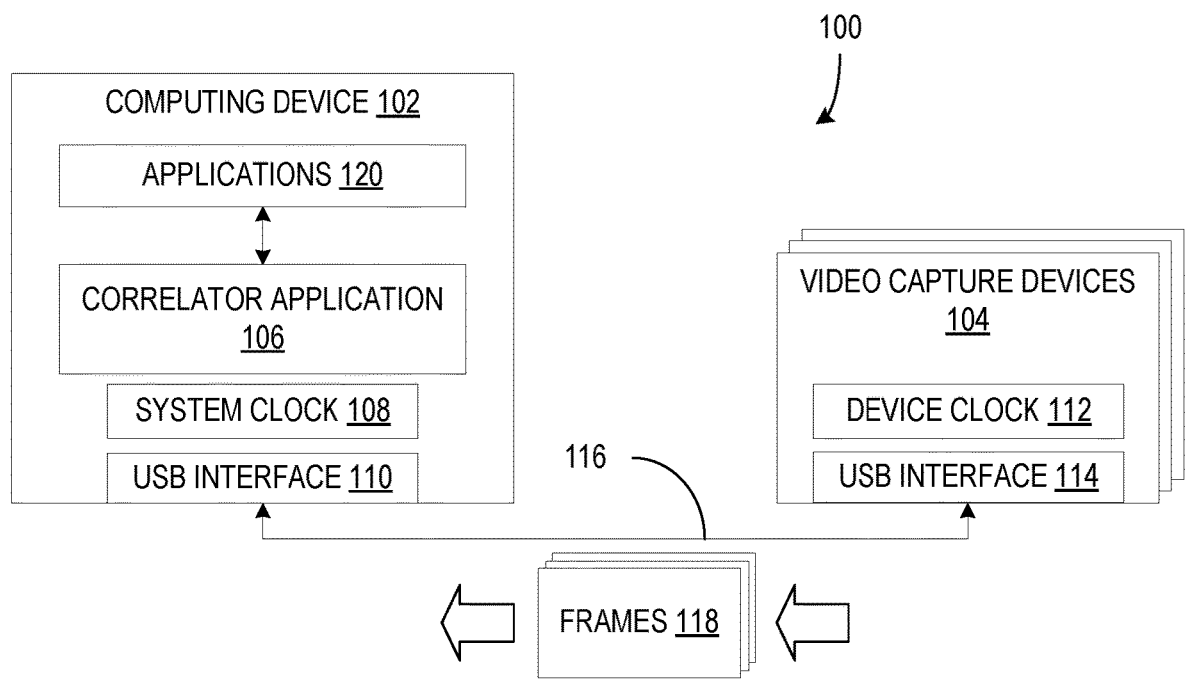
FIG. 1 is an exemplary block diagram illustrating a system including a computing device and video capture devices configured to capture video streams and correlate the frames of the video streams according to an embodiment.

FIG. 1 is an exemplary block diagram illustrating a system 100 including a computing device 102 and video capture devices 104 configured to capture video streams and correlate the frames 118 of the video streams according to an embodiment. The computing device 102 includes a correlator application 106 that is configured to receive the video stream frames 118 from the video capture devices 104 and correlate the video stream frames 118 using the system clock 108 as described herein. The video stream frames 118 are received via a universal serial bus (USB) interface 110. The correlator application 106 provides correlated frames to one or more applications 120, which may use the correlated video stream frames 118 in various ways (e.g., display, further processing, image analysis, etc.).

The video capture devices 104 each include a device clock 112 and a USB interface 114. Captured video stream frames 118 are timestamped by the video capture devices 104 based on the device clock 112 and sent to the computing device 102 using the USB interface 114. A USB bus 116 connects the USB interface 114 to the USB interface 110.

The computing device 102 may be a personal computer, a server device, a laptop, a tablet, a mobile phone, a game system, a wearable device, or the like. The computing device 102 may include one or more processors, memory, interfaces, and/or other computer components. The correlator application 106 may be stored in memory of the computing device 102 and configured to correlate the timestamps of frames 118 as described herein. In some examples, the correlator application 106 includes driver software, firmware, or the like, and may execute at the user level or the kernel level. The system clock 108 of the computing device 102 is configured to provide accurate measurement of the passage of time and the correlation of the frames 118 may be based on time measurements made using the system clock 108.

The USB interface 110 may comprise a conventional USB interface as would be understood by a person of ordinary skill in the art. This may include, for instance, at least one physical USB port configured to admit a USB cable, physical connections to other portions of the computing device 102, firmware and/or software configured to enable communication over the USB interface 110 using USB protocols, or the like.

In some examples, the computing device 102 comprises a plurality of interfaces, including the USB interface 110, enabling the computing device 102 to interact with a variety of other entities. For instance, the computing device may include network interfaces beyond the USB interface 110 (e.g., wired network interfaces such as Ethernet interfaces, wireless network interfaces such as Wi-Fi interfaces or cellular network interfaces, user interfaces such as displays, touchscreens, speakers, microphones, keyboards, mice, game controllers, etc.). It should be understood that the computing device 102 may include any combination of interfaces that enables the computing device 102 to perform the operations described herein without departing from the description.

The video capture devices 104 may include one or more visible light-based cameras such as red-green-blue (RGB) cameras, depth-based cameras, infrared-based cameras, or other types of cameras. The video capture devices 104 may each be configured to collect video data, buffer or store the video data at defined levels of quality (e.g., 720p, 1080p, 4K, etc.), and send the video data to the computing device 102 using a USB interface 114. The device clock 112 of each video capture device 104 is configured to provide time measurements that are used by the video capture devices 104 to timestamp frames 118 of the captured video data as described herein.

Each video capture device 104 may be connected to and/or in communication with the computing device 102 via a bus 116. In some examples, the bus 116 may include wireless communication alone or in combination with wired communication. Each video capture device 104 may be connected to the computing device 102 via a separate bus 116, multiple video capture devices 104 may be connected to the computing device 102 via a single bus 116, or a combination thereof. In some examples, the bus 116 may be a direct connection between the video capture devices 104 and the computing device 102. Alternatively, the bus 116 may be an indirect connection that includes one or more hubs, switches, or other network components, etc. without departing from the description herein.

Figure 2:
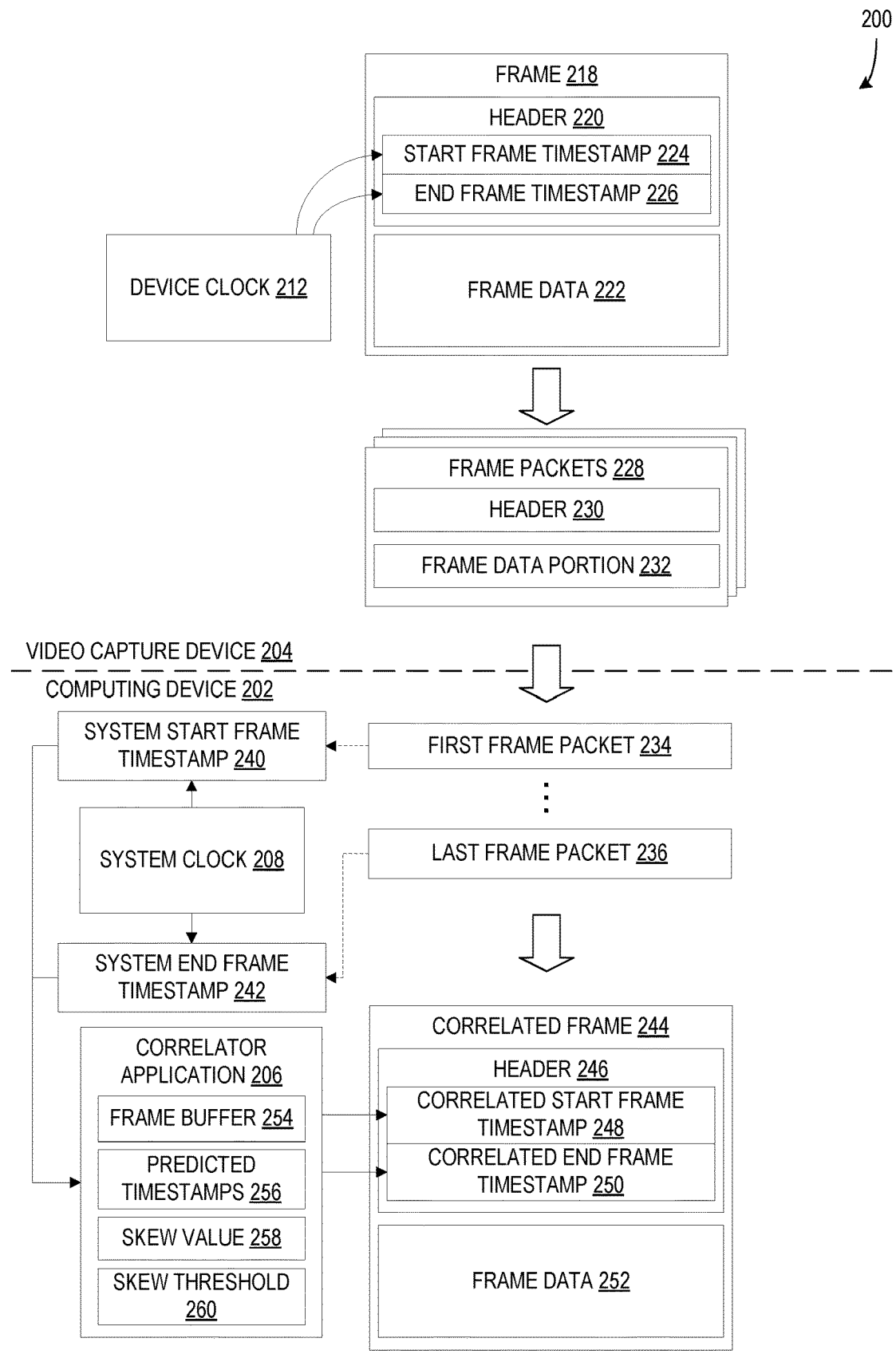
FIG. 2 is an exemplary block diagram illustrating a frame being transferred from a video capture device to a computing device according to an embodiment.

FIG. 2 is an exemplary block diagram 200 illustrating a frame 218 being transferred from a video capture device to a computing device according to an embodiment. The frame 218 is generated by the video capture device 204 based on captured video data. The frame 218 includes a header 220 storing metadata associated with the frame 218 and the frame data 222 including the captured video data of the frame. Upon generation of the frame 218, the video capture device 204 generates a start frame timestamp 224 representing a moment in time when capture of the video data associated with the frame 218 began and an end frame timestamp 226 representing a moment in time when the capture of the video data associated with the frame 218 ended relative to the device clock 212. The start frame timestamp 224 and the end frame timestamp 226 are included in the header 220 of the frame 218. Alternatively, the timestamps 224 and 226 may be associated with the frame 218 in different ways without departing from the description herein (e.g., timestamps 224 and 226 may be stored separately and mapped to frame 218 based on a frame ID, etc.). For example, the applications 120 in FIG. 1 may query the video capture device 204 using an application programming interface (API) to obtain the timestamps 224 and 226.

In some examples, the frame 218 may be broken into multiple frame packets 228 to be sent to the computing device 202 (e.g., via a USB bus 116, etc.). The number and size of each of the frame packets 228 may be determined based on the communication protocol used and the size of the frame 218 (e.g., the USB protocol may have a maximum packet size of 1 kilobyte (KB) and, if frame 218 is ~3 megabytes (MB), the frame 218 may be broken into 3000 frame packets 228, etc.). Each frame packet 228 includes a header 230 for metadata associated with the frame 218 and/or the specific frame packet 228 and a frame data portion 232 of the frame data 222 (e.g., a frame identifier, a frame packet identifier, frame sequence information, etc.). In some examples, the header 230 of each frame packet 228 may include the start frame timestamp 224 and end frame timestamp 226 of the frame 218.

In some examples, the video capture device 204 may do further processing of the frame 218 prior to sending it to the computing device. Such processing may include compression, noise reduction, and/or other image processing. Such processing may increase the time required between the capture of the frame 218 the transfer of the frame 218 to the computing device 202.

The frame packets 228, including a first frame packet 234 and a last frame packet 236, are sent serially to the computing device 202 (e.g., via USB bus 116, etc.). Upon receiving the first frame packet 234, a system start frame timestamp 240 for the frame 218 may be generated using time as measured by the system clock 208 of the computing device 202 (e.g., system timestamps may be generated based on QueryPerformanceCounter (QPC) functionality of the operating system (OS) associated with the computing device 202, etc.). Upon receiving the last frame packet 236, a system end frame timestamp 242 may be generated, also using the time as measured by the system clock 208 of the computing device 202. The first frame packet 234 may be detected based on the packet being the first packet received associated with the frame 218 (e.g., packet metadata may include a frame identifier, etc.) and/or packet sequence data indicating that the packet is the first packet. The last frame packet 236 may also be detected based on metadata of the packet (e.g., a last frame flag is set, the metadata includes a final packet sequence value and the last frame packet 236 includes a sequence value that matches the final packet sequence value, etc.). Alternatively, or additionally, the frame data portion 232 of the last frame packet 236 may include end-of-frame or end-of-file (EOF) data that is identified by the computing device 202.

The system start frame timestamp 240 and system end frame timestamp 242 are provided to the correlator application 206 of the computing device 202. Other data associated with the frame 218 may also be provided to the correlator application 206 (e.g., a frame identifier, a video stream identifier, the start frame timestamp 224 and the end frame timestamp 226 of the frame 218, etc.). The computing device 202 and correlator application 206 are configured to generate a correlated frame 244, including a header 246 and frame data 252, from the received frame packets 228 of the frame 218, wherein the correlated frame 244 has been correlated to the timing of the system clock 208 and other frames that have also been received by the computing device 202. The correlator application 206 generates correlated start frame timestamp 248 and correlated end frame timestamp 250 for inclusion in the header 246 of the correlated frame 244. The correlated timestamps 248 and 250 are based on the start frame timestamp 224 and end frame timestamp 226 of the original frame 218, the system start frame timestamp 240 and system end frame timestamp 242 based on the system clock 208, and/or on timestamps associated with other received frames of the same video stream.

The correlator application 206 includes a frame buffer 254, predicted timestamps 256, a calculated skew value 258 associated with the frame 218, and a defined skew threshold 260 that are used in correlating the timestamps 248 and 250 of the correlated frame 244. In some examples, the frame buffer 254 includes previously received frames of the video stream with which the frame 218 is associated. In other examples, the frame buffer 254 of the correlator application 206 includes multiple frame buffers associated with multiple video streams, enabling the correlator application 206 to correlate and/or synchronize frames of multiple video streams as described below with respect to FIG. 4. The frame buffer 254 may be configured as a circular buffer or linked list, such that the buffer retains frame data for a defined number of frames and, when frame data of a new frame is added to the frame buffer 254, the oldest frame data is removed and/or overwritten by the new frame data. The frame data stored in the frame buffer 254 may include, for instance, a mapping of start frame timestamps and/or end frame timestamps of the previously received frames of the associated video stream. The start and end timestamps of the previously received frames (e.g., start frame timestamps and end frame timestamps that have previously been correlated to the system clock 208 as described herein mapped to associated frame IDs, frame sequence IDs, etc.) enable the correlator application 206 to analyze the timestamp data of multiple frames to detect patterns and/or predict timestamps 256 of received frames of the video stream (e.g. frame 218, etc.).

In some examples, the correlator application 206 is configured to calculate an average clock differential value for the video stream of the frame 218 based on the timestamp data of the frame buffer 254. The differences between the start frame and end frame timestamps of a frame based on the device clock 212 and the system start frame and system end frame timestamps of the frame based on the system clock 208 may be averaged across some or all of the previously received frames in the frame buffer 254 (e.g., averaged across the previous few minutes of frames), resulting in an average clock differential value indicating the average time required for a frame to reach the computing device 202 after being captured by the video capture device 204 and/or average time difference between the device clock 212 and the system clock 208.

Additionally, or alternatively, the correlator application 206 may be configured to calculate an average framerate and/or frame length based on the frame data of the frame buffer 254. The differences in the correlated start frame timestamps and correlated end frame timestamps of the frames of the frame buffer 254 may be combined and then the result is divided by the number of frames in the frame buffer 254 (e.g., if the sum of the frame lengths in the frame buffer 254 is 5 seconds and the frame buffer 254 includes 300 frames, the average frame length is 16.67 milliseconds (ms), etc.). The calculated average frame length may be used when generating predicted timestamps 256 for the frame 218 as described herein. Further, the average framerate may be calculated based on a total number of frames received in the frame buffer 254 divided by a defined time period (e.g., if the frame buffer includes frame data of 300 received frames and the difference between the timestamps of the first frame and the last frame is 6 seconds, the average framerate may be calculated as 50 frames per second (fps), etc.).

Other values may also be calculated based on the frame data of the frame buffer 254 for use in generating predicted timestamps 256. For instance, the correlator application 206 may calculate an average time between frames (e.g., the time between the correlated end frame timestamp of a frame and the correlated start frame timestamp of the next frame in sequence, etc.), which can be used to predict a timestamp of a start of an incoming frame based on an end of a recently received frame.

In some examples, the correlator application 206 may obtain information from the USB interface and/or bus driver software, such as a current bandwidth of the USB communication and/or timestamps based on when the frame was initially placed onto the bus at the video capture device 204. The USB start frame timestamp may be synchronized to the system clock 208, enabling the correlator application 206 to generate predicted timestamps 256 with accuracy. A USB end frame timestamp that is similarly synchronized to the system clock 208 may also be added to the final packet of a frame and used by the correlator application 206 to correlate the frame to the system clock 208 and the other frames of the video stream.

The correlator application 206 is configured to generate predicted timestamps 256 based on the collected and/or calculated values described above. For instance, a predicted start frame timestamp may be generated based on an average clock differential value between the device clock 212 and the system clock 208 and/or a USB-based start frame timestamp. The predicted start frame timestamp may account for processing time at the video capture device 204, duration or latency associated with the transfer of the frame 218 from the video capture device 204 and the computing device 202, duration or latency associated with processing of the frame at the video capture device 204, and time differences between the system clock 208 and device clock 212, etc. Further, the predicted start frame timestamp may be generated to correlate to the previously received frames in the frame buffer 254 based on calculated average framerate, calculated average frame length, and/or calculated average time between frames, etc. (e.g., at an average framerate of 60 frames per second, each frame is 16.67 ms long and a predicted start frame timestamp may be generated to be 16.67 ms after the correlated start frame timestamp of the immediately previous frame in the frame buffer 254, etc.). Generating the predicted end frame timestamp of the predicted timestamps 256 may be based on the predicted start frame timestamp and a calculated average frame length based on the received frames of the frame buffer 254, such that the predicted timestamps 256 are correlated closely with the timestamps of the frames of the frame buffer 254.

Upon calculating the predicted timestamps 256, the correlator application 206 is configured to calculate a skew value 258 of the received frame 218. The skew value 258 is based on the comparison of the predicted timestamps 256 to the measured timestamps of the frame 218 (e.g., the start frame timestamp 224, end frame timestamp 226, system start frame timestamp 240, system end frame timestamp 242, etc.). In some examples, the predicted timestamps 256 are generated to be relative to the capture of the frame 218 on the video capture device 204 (e.g., relative to the start frame timestamp 224 and end frame timestamp 226, etc.). The skew value 258 is calculated as the difference between predicted timestamps 256 and the measured timestamps of the frame 218. The skew value 258 may represent that the measured timestamps differ from the predicted timestamps 256 by an amount of time (e.g., the entire frame 218 is skewed early or late, etc.) and/or that the time difference between the predicted timestamps 256 differs from the time difference between the measured timestamps (e.g., the frame length of the frame 218 is longer or shorter than a predicted frame length, etc.). The skew value 258 may include one or more values representing the various timestamp differences detected (e.g., differences between the predicted start frame timestamp and the measured start frame timestamp, differences between the predicted end frame timestamp and the measured end frame timestamp, etc.).

The correlator application 206 is configured to compare the skew value(s) 258 to at least one defined skew threshold 260. In some examples, when the skew value 258 exceeds the skew threshold 260, the predicted timestamps 256 are used as the correlated start frame timestamp 248 and correlated end frame timestamp 250 for the correlated frame 244. When the skew value 258 does not exceed the skew threshold 260, the measured timestamps of the frame 218 may be used for the correlated start frame timestamp 248 and correlated end frame timestamp 250.

In some examples, the skew threshold 260 includes a skew threshold associated with start frame timestamp differences and a skew threshold associated with end frame timestamp differences. If one of the skew thresholds is exceeded by the associated skew value and the other skew threshold is not exceeded, the correlator application 206 may replace the timestamp (e.g., start frame or end frame, etc.) associated with the exceeded skew threshold with the predicted timestamp as the correlated timestamp in the correlated frame 244 while the other measured timestamp is maintained as the correlated timestamp in the correlated frame 244. Alternatively, if one or both skew thresholds are exceeded by the associated skew values, the correlator application may replace both measured timestamps of the frame 218 with the predicted timestamps 256 as the correlated timestamps 248 and 250 of correlated frame 244.

Alternatively, or additionally, the skew threshold 260 may be configured to apply to frame skew that represents the timing of the entire frame 218 being skewed early or late, or to frame skew that represents the measured length of the frame 218 being longer than the predicted frame length by the skew threshold 260. In the case of the entire frame 218 being skewed by more than the skew threshold 260, the correlated timestamps 248 and 250 may be corrected to match the predicted timestamps 256. Alternatively, in the case of the measured frame length exceeding the predicted frame length by more than the skew threshold 260 (e.g., the measure end frame timestamp of the frame 218 is later than the predicted end frame timestamp, etc.), the correlated end frame timestamp 250 may be corrected to match the predicted end frame timestamp of the predicted timestamps 256, effectively "clipping" the frame 218 to create the correlated frame 244. If the measured frame length is less than the predicted frame length, the difference may be ignored, maintaining the measured timestamps of the frame 218.

The correlator application 206 may be further configured to add the frame data, including the correlated timestamps 248 and 250, of the correlated frame 244 to the frame buffer 254 for future use by the correlator application 206. In some examples, the oldest frame data of the frame buffer 254 may be removed or otherwise overwritten by the new frame data.

Figure 3:
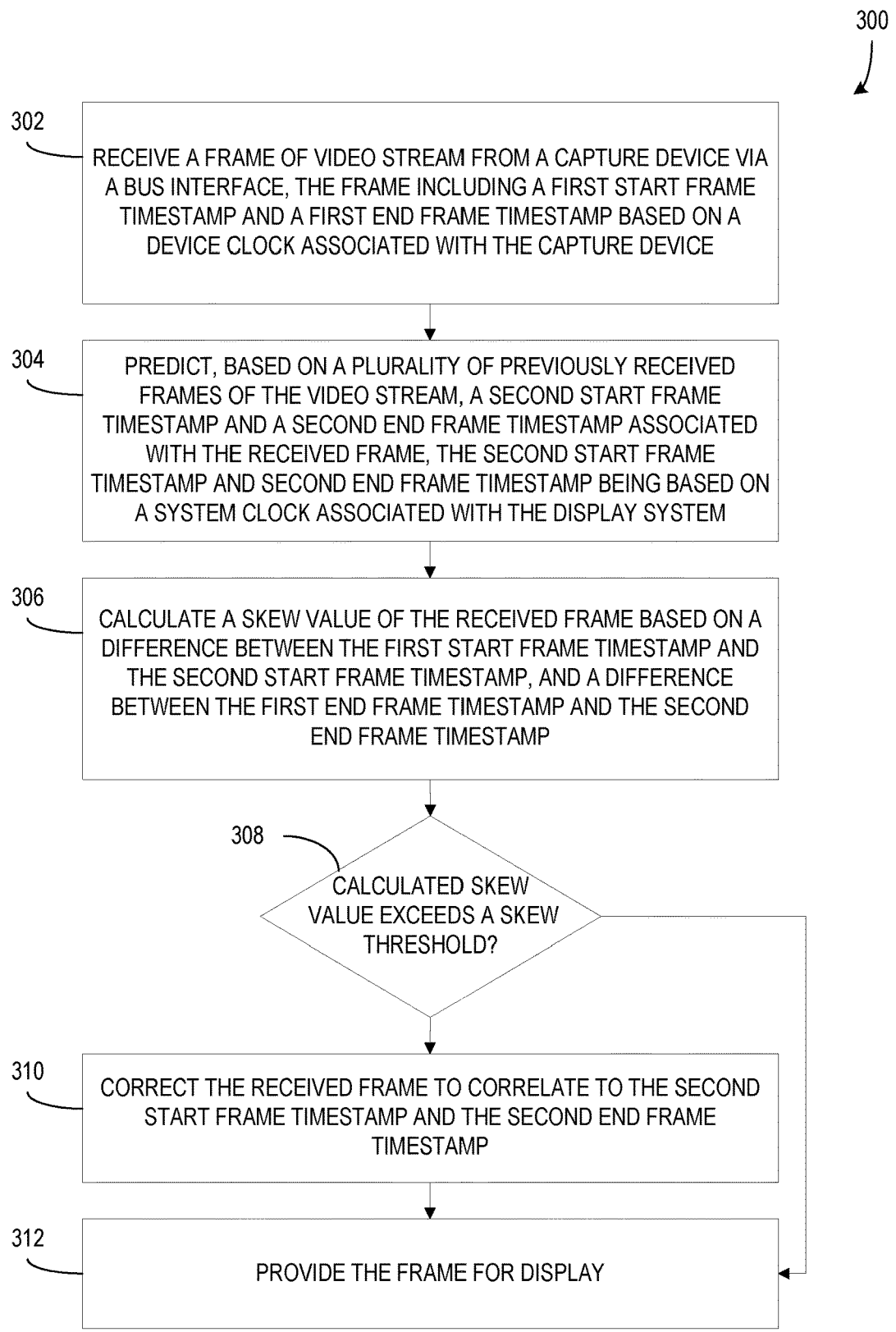
FIG. 3 is an exemplary flow chart illustrating operation of a computing device to receive a frame and correlate the frame based on predicted timestamps according to an embodiment.

FIG. 3 is an exemplary flow chart 300 illustrating operation of a computing device (e.g., computing device 202, etc.) to receive a frame (e.g., frame 218, etc.) and correlate the frame based on predicted timestamps (e.g., predicted timestamps 256, etc.) according to an embodiment. The operations of flow chart 300 may be performed by one or more software applications configured to do so (e.g., correlator application 206, etc.) on a computing device of a display system. At 302, a frame of a video stream is received from a capture device (e.g., video capture device 204, etc.) via a bus interface (e.g., USB interface 110, etc.), the frame including a first start frame timestamp (e.g., start frame timestamp 224, etc.) and a first end frame timestamp (e.g., end frame timestamp 226, etc.) based on a device clock (e.g., device clock 212, etc.) associated with the capture device. In some examples, the frame is received in a series of packets as described above, each packet including the first start frame timestamp and the first end frame timestamp in a header portion of the packet. Upon receipt of the frame packets, they may be used to reconstruct the frame during the process described in flow chart 300. The received frame may be one in a series of frames of the video stream previously received from the capture device. The bus interface may include a USB interface and/or other types of bus interfaces that may be used without departing from the description herein.

At 304, a second start frame timestamp and a second end frame timestamp are predicted (e.g., predicted timestamps 256, etc.) based on a plurality of previously received frames of the video stream (e.g., frames in the frame buffer 254, etc.), the second start frame timestamp and the second end frame timestamp being based on a system clock (e.g., system clock 208, etc.) associated with the display system. The second start frame timestamp and second end frame timestamp may be predicted based on one or more collected and/or calculated values associated with the previously received frames of the video stream and/or the bus interface and associated aspects of the bus, protocol, etc. (e.g., average framerate, average frame length, bus bandwidth, bus-based timestamps, clock differential values, etc.) as described above.

At 306, a skew value of the received frame is calculated based on a difference between the first start frame timestamp and the second start frame timestamp, and a difference between the first end frame timestamp and the second end frame timestamp. In some examples, the calculated skew value is in the form of a discrete number of time units (e.g., 3 ms, 2.6 ms, etc.). Alternatively, or additionally, the calculated skew value may include values relative to the received frame and other frames of the video stream. For instance, a skew value may indicate that the received frame has a 10% longer frame length than the average frame length for frames of the associated video stream, or a skew value may indicate that the measured timestamps of the received frame is skewed 20% out of sync with the predicted timestamps of the received frame (e.g., the received frame length matches the predicted frame length at 20 ms, but the measured start frame and end frame timestamps of the received frame are 4 ms later than the predicted start frame and end frame timestamps, etc.), etc.

If, at 308, the calculated skew value exceeds a skew threshold, the received frame is corrected to correlate to the second start frame timestamp and the second end frame timestamp at 310. After the received frame has been corrected, it is provided for display at 312. In some examples, correcting the received frame includes correcting the timestamps of the received frame to match the predicted timestamp values as described herein.

Alternatively, if the calculated skew value does not exceed the skew threshold at 308, the received frame is provided for display at 312.

At 312, providing the frame for display may include displaying, on a user interface, the frame in sequence with other frames of the video stream immediately as live video. Alternatively, the frame may be combined with other frames of the video stream into a stored video file that may then be played at a later time.

In some examples, the received frame is provided for display via the applications 120 in FIG. 1, which may first perform additional processing on the received frame prior to display.

In some examples, the provided frame is further used to update a frame buffer for use in correlating received frames in the future. Predicted frames are based on the frame data of the frame buffer and, because the measured timestamps of frames are used unless they are skewed too far from the predicted timestamps, the calculated average data values may change over time in response to the frame buffer being updated with the measured timestamps of received frames. Thus, the predicted timestamps may change dynamically to reflect changing characteristics of the video capture device, the communication bus and/or interfaces, or the like.

Figure 4:
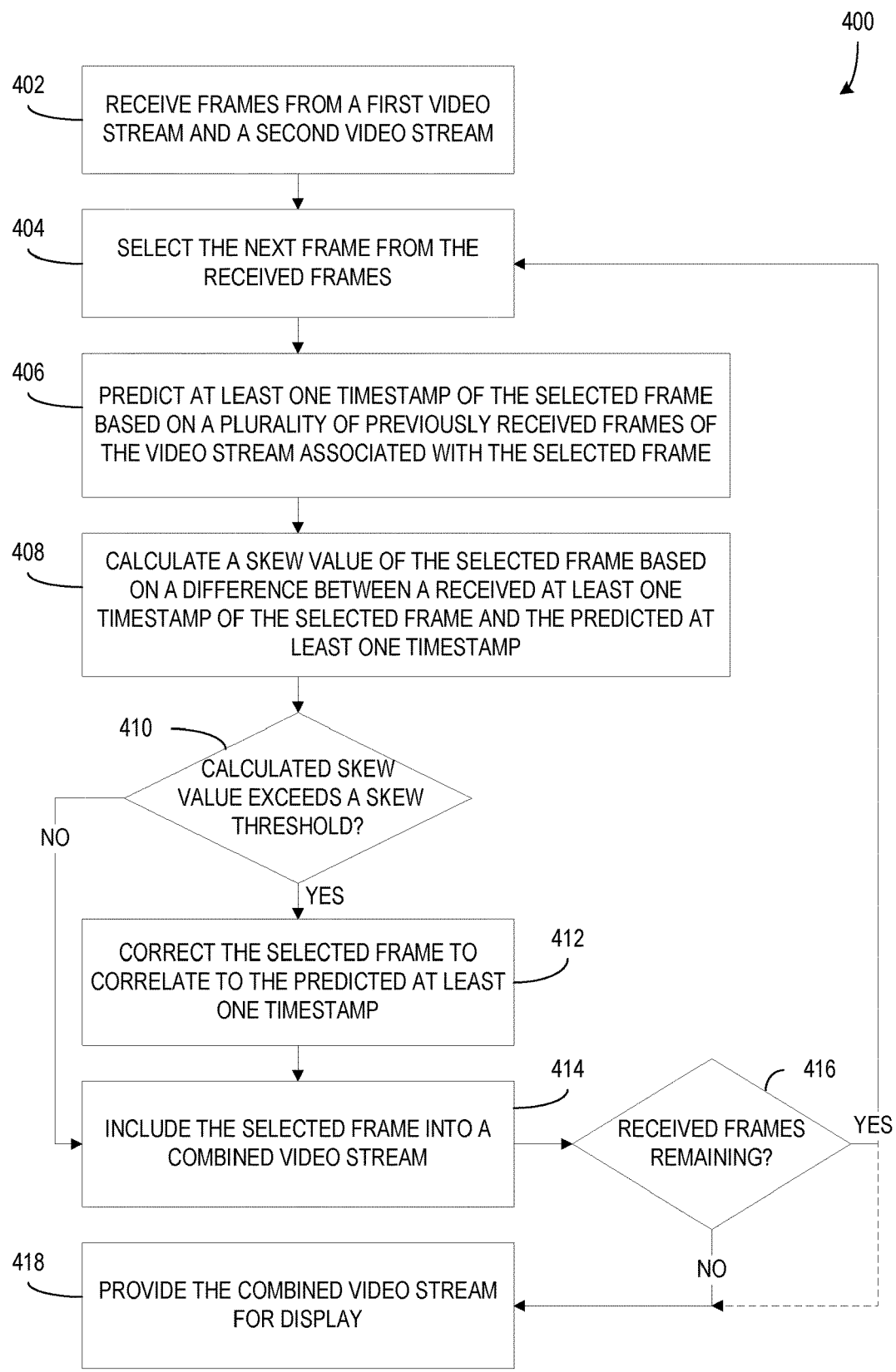
FIG. 4 is an exemplary flow chart illustrating operation of a computing device to receive frames of multiple video streams, correlate the received frames, and combine the multiple video streams into a combined video stream according to an embodiment.

FIG. 4 is an exemplary flow chart 400 illustrating operation of a computing device (e.g., computing device 202, etc.) to receive frames (e.g., frame 218, etc.) of multiple video streams, correlate the received frames, and combine the multiple video streams into a combined video stream according to an embodiment. As in FIG. 3, the operations of flow chart 400 may be performed by one or more software applications configured to do so (e.g., correlator application 206, etc.) on a computing device of a display system. At 402, frames from a first video stream and a second video stream are received. The frames from the multiple streams may be received via a single bus interface or over multiple interfaces. Each frame may include an identifier for the associated video stream enabling the frames to be sorted by the computing device. The frames may be processed in order as they are received and/or stored in a queue in order until they can be correlated as described herein. In some examples, the frames may be received continuously during the operations described in the flow chart 400, such that the described operations may occur repeatedly for as long as frames are received.

At 404, the next received frame is selected by the computing device (e.g., computing device 202 and/or specifically correlator application 206, etc.) to be correlated. At 406, at least one timestamp of the selected frame is predicted based on a plurality of previously received frames of the video stream associated with the selected frame. In some examples, the at least one timestamp includes a start frame timestamp and an end frame timestamp as described herein. Predicting the at least one timestamp may include accessing a frame buffer (e.g., frame buffer 254, etc.) that is specific to the video stream of the selected frame and generating at least one predicted timestamp as described above with respect to FIG. 2.

At 408, a skew value of the selected frame is calculated based on a difference between a received at least one timestamp of the selected frame and the predicted at least one timestamp. For instance, if the selected frame includes a start frame timestamp, a predicted start frame timestamp is generated and compared to the received start frame timestamp, resulting in a calculated skew value of the received start frame timestamp. In examples where a start frame timestamp and an end frame timestamp are received, the skew value(s) may be calculated based on predicted start frame and predicted end frame timestamps as described herein.

At 410, if the calculated skew value exceeds a skew threshold, the selected frame is corrected to correlate to the predicted at least one timestamp at 412. Alternatively, if the calculated skew value does not exceed the skew threshold at 410, the selected frame is included into a combined video stream at 414 as described below. In some examples, the skew threshold may be defined specifically for one of the multiple video streams, such that skew values of frames associated with each video stream are compared to stream-specific skew thresholds (e.g., the first video stream may have a skew threshold of 3 ms and the second video stream may have a skew threshold of 2 ms, etc.). Alternatively, the skew threshold may be identical for all video streams.

At 412, the selected frame is corrected to correlate to the predicted at least one timestamp. In some examples, correcting the selected frame includes setting timestamps of the selected frame to correlated timestamp values (e.g., correlated start frame timestamp 248 and correlated end frame timestamp 250, etc.). Correlating the timestamp values may include correcting the received timestamps of the selected frame to match the predicted timestamps due to the excessive skew values of the received timestamps.

At 414, the selected frame is included into the combined video stream. The combined video stream includes correlated frames from each of the first and second video streams, combined in such a way to form a single video stream. For instance, the combined video stream may be a three-dimensional video stream based on combining the two video streams. The two video streams may include two RGB-based video streams from two different angles, an RGB-base video stream and a depth-based video stream, an RGB-based video stream and an infrared (IR) video stream, etc. Each frame of the first video stream may be matched with a frame of the second video stream based on correlated timestamps to synchronize the two video streams. Any methods for combining frames of the now-correlated multiple video streams into a single video stream understood by a person of ordinary skill in the art may be used without departing from the description herein. Further, it should be understood that more than two video streams may be processed, correlated, and combined as described with respect to FIG. 4.

At 416, if received frames remain that have not been processed, the next frame is selected at 404. Alternatively, if the no received frames remain to be processed, the combined video stream is provided for display at 418. Further, the combined video stream may be provided for display at 418 while the operations of flow chart 400 are being performed on remaining frames, such that frames of the combined video stream that have already been processed may be displayed while the remaining frames are processed as described. Viewing the combined video stream may include viewing a three-dimensional representation of a scene or room based on the multiple video streams, viewing an area from multiple locations based on the multiple video streams, or the like.

Additional Example Scenarios

Aspects of the disclosure enables various scenarios, such as next described.

In an example, a user of a computing device is viewing a live video stream from a USB-based camera device connected to the computing device via a USB cable. A frame of the video stream is timestamped by the camera device using the associated device clock as it is captured. The timestamps include a start frame timestamp and an end frame timestamp. The camera device performs a compression operation on the frame and transfers the compressed frame to the computing device over the USB cable. Transfer over the USB cable includes dividing the frame data up into multiple packets and including the timestamps of the frame in a header of each of the packets. Further, USB protocol-based timestamps based on when the start frame and end frame packets are transferred via the USB interface may be included on the packet headers as well. Upon receiving the frame packets, the computing device uses a correlator application to generate predicted timestamps for the frame. The predicted start frame and end frame timestamps are generated based on the received USB protocol-based timestamps, a calculated average bandwidth of the USB interface, and a calculated average frame length based on a plurality of previously received frames stored in a frame buffer associated with the correlator application. A skew value is calculated by comparing the camera device clock-based start frame and end frame timestamps to the predicted start frame and end frame timestamps. The calculated skew value exceeds a defined skew threshold, so the correlator application corrects the timestamps of the frame to match the predicted timestamps, rather than the measured timestamps applied by the camera device. The frame is added to the live video stream and provided for viewing by the use in sequence with other frames of the video stream. Further, the frame is added to the frame buffer of the correlator application, replacing the oldest frame of the buffer.

In another example, a user is using a virtual reality device to view a three-dimensional representation of a room. An RGB-based camera and a depth-based camera are placed in the room in order to capture the video data necessary to generate the three-dimensional video stream for display to the user. Both cameras are transferring video stream frame data to the virtual reality device via USB-based wireless communication interfaces. Frames from each camera are transmitted in streams of packets to the virtual reality device as described herein. The virtual reality device includes a correlator application that receives and correlates the frames from both cameras based on characteristics specific to each video stream in order to synchronize both video streams to the system clock of the virtual reality device. The correlator application includes a frame buffer specific to each video stream and generates predicted timestamps for a received frame based on the previously received frames of the frame buffer specific to the received frame. Skew values for each frame are compared to defined skew thresholds that are also specific to the associated video stream and, when a skew threshold is exceeded by the skew value of a frame, the predicted timestamps for the frame are used to correlate the frame timestamps with the system clock of the virtual reality device as described herein. Once frames from each video stream are correlated to the system clock, they are in sync with each other and may be combined to create a high-quality three-dimensional video stream for viewing by the user.

Exemplary Operating Environment

Figure 5:
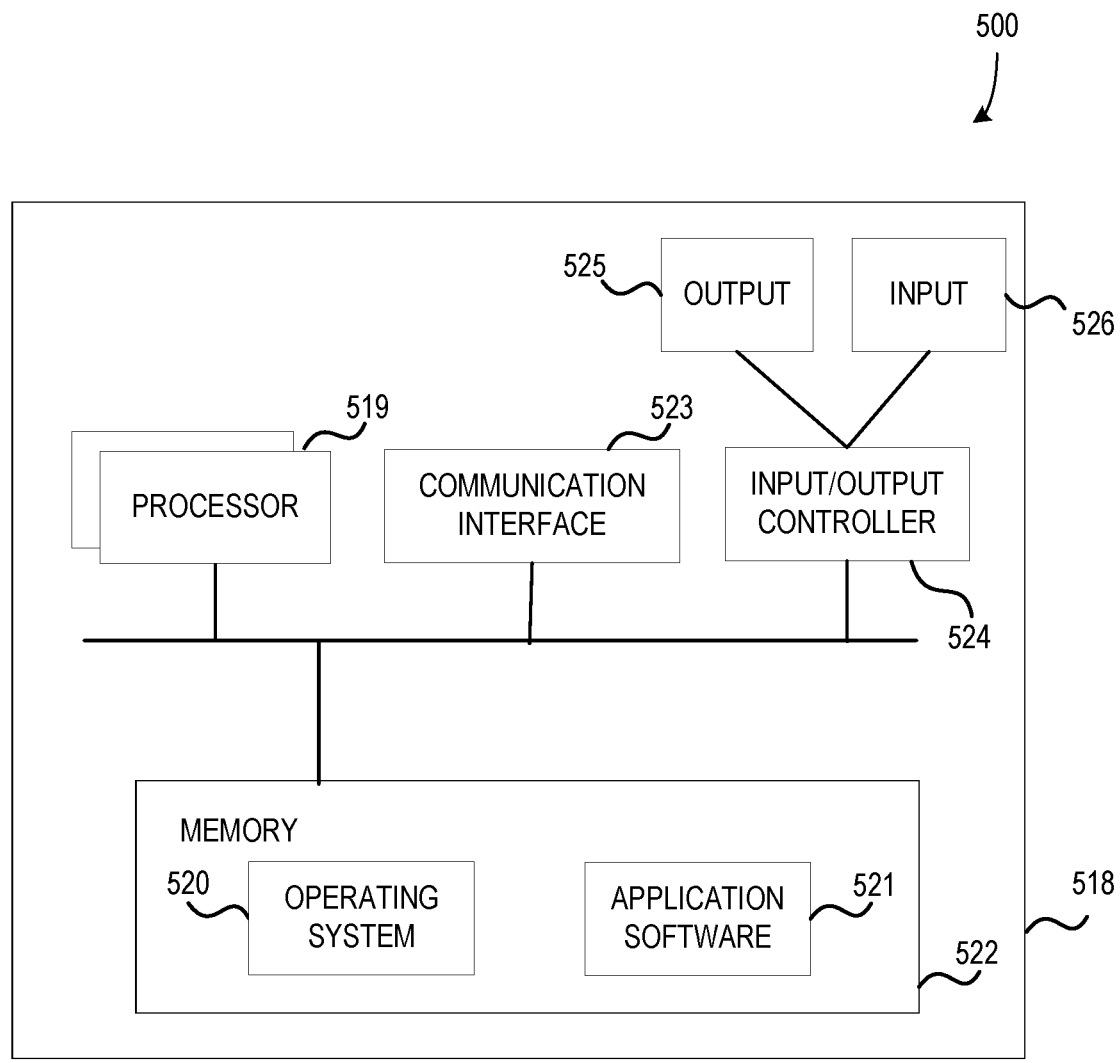
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Platform software comprising an operating system 520 or any other suitable platform software may be provided on the apparatus 518 to enable application software 521 to be executed on the device. According to an embodiment, correlation of frames of video streams using a system clock may be accomplished by software.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user 527 may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in laptop computers, tablet computers, game consoles or game controllers, various wearable devices, etc.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A computerized display system for correlating timestamps of video frames from a capture device comprising:
at least one processor;
at least one memory comprising computer program code, the at least one memory and the computer program code configured to, with the at least one processor, cause the at least one processor to:
receive, by a correlator application, a frame of a video stream from a capture device via a bus interface, the frame including a first start frame timestamp and a first end frame timestamp based on a device clock associated with the capture device;
predict, by the correlator application, based on a plurality of previously received frames of the video stream, a second start frame timestamp and a second end frame timestamp associated with the received frame, the second start frame timestamp and second end frame timestamp being based on a system clock associated with the display system;
calculate, by the correlator application, a skew value of the received frame based on a difference between the first start frame timestamp and the second start frame timestamp, and a difference between the first end frame timestamp and the second end frame timestamp;
upon the calculated skew value exceeding a skew threshold, correct, by the correlator application, the received frame to correlate to the second start frame timestamp and the second end frame timestamp; and provide the corrected frame for display.
predicting the second start frame timestamp includes maintaining a mapping of start frame timestamps of the plurality of previously received frames of the video stream.
predicting the second start frame timestamp and the second end frame timestamp includes determining an average frame length of the plurality of previously received frames of the video stream, wherein the predicted second start frame timestamp and second end frame timestamp are separated by the determined average frame length.
correcting the received frame includes clipping the received frame to fit the predicted second start frame timestamp and second end frame timestamp and re-timestamping the received frame with the predicted second start frame timestamp and second end frame timestamp.
the at least one memory comprises computer program code, the at least one memory and the computer program code configured to, with the at least one processor, further cause the at least one processor to combine the received frame with the plurality of received frames of the video stream.
the video stream is synchronized with another video stream; and
the corrected frame is synchronized with a matching frame of the other video stream based on at least one of the second start frame timestamp and the second end frame timestamp.
the video stream is a visible light-based video stream and the other video stream is an infrared-based video stream.
the video stream is a visible-light based video stream capturing a scene from a first angle and the other video stream is a visible-light based stream capturing the scene from a second angle.
the video stream includes live video.
the bus interface is a universal serial bus (USB) interface.
A computerized method for correlating timestamps of video frames from a capture device, the computerized method comprising: receiving, by a correlator application, a frame of a video stream from a capture device via a bus interface, the frame including a first start frame timestamp and a first end frame timestamp based on a device clock associated with the capture device;
predicting, by the correlator application, based on a plurality of previously received frames of the video stream, a second start frame timestamp and a second end frame timestamp associated with the received frame, the second start frame timestamp and second end frame timestamp being based on a system clock associated with a computing device of the correlator application;
calculating, by the correlator application, a skew value of the received frame based on a difference between the first start frame timestamp and the second start frame timestamp, and a difference between the first end frame timestamp and the second end frame timestamp;
upon the calculated skew value exceeding a skew threshold, correcting, by the correlator application, the received frame to correlate to the second start frame timestamp and the second end frame timestamp;
combining the received frame with the plurality of received frames of the video stream; and
providing the video stream for display.

wherein predicting the second start frame timestamp includes maintaining a mapping of start frame timestamps of the plurality of previously received frames of the video stream.
wherein predicting the second start frame timestamp and the second end frame timestamp includes determining an average frame length of the plurality of previously received frames of the video stream, wherein the predicted second start frame timestamp and second end frame timestamp are separated by the determined average frame length.
wherein correcting the received frame includes clipping the received frame to fit the predicted second start frame timestamp and second end frame timestamp and re-timestamping the received frame with the predicted second start frame timestamp and second end frame timestamp.
wherein the video stream is synchronized with another video stream; and the corrected frame is synchronized with a matching frame of the other video stream based on at least one of the second start frame timestamp and the second end frame timestamp.
wherein the video stream is a visible light-based video stream and the other video stream is a depth-based video stream.
wherein the video stream is a visible-light based video stream capturing a scene from a first angle and the other video stream is a visible-light based stream capturing the scene from a second angle.
One or more computer storage media having computer-executable instructions for correlating timestamps of video frames from capture devices that, upon execution by a processor, cause the processor to at least:
receive a frame of a video stream from a capture device via a bus interface, the frame including a first start frame timestamp and a first end frame timestamp based on a device clock associated with the capture device;
predict based on a plurality of previously received frames of the video stream, a second start frame timestamp and a second end frame timestamp associated with the received frame, the second start frame timestamp and second end frame timestamp being based on a system clock associated with the processor;
calculate a skew value of the received frame based on a difference between the first start frame timestamp and the second start frame timestamp, and a difference between the first end frame timestamp and the second end frame timestamp;
upon the calculated skew value exceeding a skew threshold, correct the received frame to correlate to the second start frame timestamp and the second end frame timestamp; and
provide the corrected frame for display.
the computer-executable instructions, upon execution by a processor, further cause the processor to at least:
receive frames of a second video stream from a second capture device;
timestamp the received frames of the second video stream;
combine the video stream with the second video stream; and
wherein the corrected frame is synchronized with a matching frame of the second video stream.
the video stream is a visible light-based video stream and the second video stream is a depth camera-based video stream; and wherein combining the video stream with the second video stream creates a three-dimensional correlated video stream.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for receiving a frame of a video stream from a capture device via a bus interface, the frame including a first start frame timestamp and a first end frame timestamp based on a device clock associated with the capture device; means for predicting, based on a plurality of previously received frames of the video stream, a second start frame timestamp and a second end frame timestamp associated with the received frame, the second start frame timestamp and second end frame timestamp being based on a system clock associated with the display system; means for calculating a skew value of the received frame based on a difference between the first start frame timestamp and the second start frame timestamp, and a difference between the first end frame timestamp and the second end frame timestamp; means for correcting the received frame to correlate to the second start frame timestamp and the second end frame timestamp upon the calculated skew value exceeding a skew threshold; and means for providing the corrected frame for display. The illustrated one or more processors 519 together with the computer program code stored in memory 522 constitute exemplary processing means for generating predicted timestamps based on analysis of receive frame timestamps and combining correlated frames into video streams, as described herein.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized display system for correlating timestamps of video frames from a capture device comprising:
   at least one processor;
   at least one memory comprising computer program code, the at least one memory and the computer program code configured to, with the at least one processor, cause the at least one processor to:
      receive, by a correlator application, a frame of a video stream from a capture device via a bus interface, the frame including a first start frame timestamp and a first end frame timestamp based on a device clock associated with the capture device;
      predict, by the correlator application, based on a plurality of previously received frames of the video stream, a second start frame timestamp and a second end frame timestamp associated with the received frame, the second start frame timestamp and second end frame timestamp being based on a system clock associated with the display system;
      calculate, by the correlator application, a skew value of the received frame based on a difference between the first start frame timestamp and the second start frame timestamp, and a difference between the first end frame timestamp and the second end frame timestamp;
      determine that the calculated skew value exceeds a skew threshold;
      based on the determining, correct, by the correlator application, the first start frame timestamp and the first end frame timestamp of the received frame to correlate to the second start frame timestamp and the second end frame timestamp; and
      provide the corrected frame for display.

2. The computerized system of claim 1, wherein predicting the second start frame timestamp includes maintaining a mapping of start frame timestamps of the plurality of previously received frames of the video stream.

3. The computerized system of claim 1, wherein predicting the second start frame timestamp and the second end frame timestamp includes determining an average frame length of the plurality of previously received frames of the video stream, wherein the predicted second start frame timestamp and second end frame timestamp are separated by the determined average frame length.

4. The computerized system of claim 1, wherein correcting the received frame includes clipping the received frame to fit the predicted second start frame timestamp and second end frame timestamp and re-timestamping the received frame with the predicted second start frame timestamp and second end frame timestamp.

5. The computerized system of claim 1, wherein the at least one memory comprises computer program code, the at least one memory and the computer program code configured to, with the at least one processor, further cause the at least one processor to combine the received frame with the plurality of received frames of the video stream.

6. The computerized system of claim 1, wherein the video stream is synchronized with another video stream; and
the corrected frame is synchronized with a matching frame of the other video stream based on at least one of the second start frame timestamp and the second end frame timestamp.

7. The computerized system of claim 6, wherein the video stream is a visible light-based video stream and the other video stream is an infrared-based video stream.

8. The computerized system of claim 6, wherein the video stream is a visible-light based video stream capturing a scene from a first angle and the other video stream is a visible-light based stream capturing the scene from a second angle.

9. The computerized system of claim 1, wherein the video stream includes live video.

10. The computerized system of claim 1, wherein the bus interface is a universal serial bus (USB) interface.

11. A computerized method for correlating timestamps of video frames from a capture device, the computerized method comprising:
receiving, by a correlator application, a frame of a video stream from a capture device via a bus interface, the frame including a first start frame timestamp and a first end frame timestamp based on a device clock associated with the capture device;
predicting, by the correlator application, based on a plurality of previously received frames of the video stream, a second start frame timestamp and a second end frame timestamp associated with the received frame, the second start frame timestamp and second end frame timestamp being based on a system clock associated with a computing device of the correlator application;
calculating, by the correlator application, a skew value of the received frame based on a difference between the first start frame timestamp and the second start frame timestamp, and a difference between the first end frame timestamp and the second end frame timestamp;
determining that the calculated skew value exceeds a skew threshold;
based on the determining, correcting, by the correlator application, the first start frame timestamp and the first end frame timestamp of the received frame to correlate to the second start frame timestamp and the second end frame timestamp;
combining the received frame with the plurality of received frames of the video stream; and
providing the video stream for display.

12. The computerized method of claim 11, wherein predicting the second start frame timestamp includes maintaining a mapping of start frame timestamps of the plurality of previously received frames of the video stream.

13. The computerized method of claim 11, wherein predicting the second start frame timestamp and the second end frame timestamp includes determining an average frame length of the plurality of previously received frames of the video stream, wherein the predicted second start frame timestamp and second end frame timestamp are separated by the determined average frame length.

14. The computerized method of claim 11, wherein correcting the received frame includes clipping the received frame to fit the predicted second start frame timestamp and second end frame timestamp and re-timestamping the received frame with the predicted second start frame timestamp and second end frame timestamp.

15. The computerized method of claim 11, wherein the video stream is synchronized with another video stream; and
the corrected frame is synchronized with a matching frame of the other video stream based on at least one of the second start frame timestamp and the second end frame timestamp.

16. The computerized method of claim 15, wherein the video stream is a visible light-based video stream and the other video stream is a depth-based video stream.

17. The computerized method of claim 15, wherein the video stream is a visible-light based video stream capturing a scene from a first angle and the other video stream is a visible-light based stream capturing the scene from a second angle.

18. One or more computer storage hardware devices having computer-executable instructions for correlating timestamps of video frames from capture devices that, upon execution by a processor, cause the processor to at least:
receive a frame of a video stream from a capture device via a bus interface, the frame including a first start frame timestamp and a first end frame timestamp based on a device clock associated with the capture device;
predict based on a plurality of previously received frames of the video stream, a second start frame timestamp and a second end frame timestamp associated with the received frame, the second start frame timestamp and second end frame timestamp being based on a system clock associated with the processor;
calculate a skew value of the received frame based on a difference between the first start frame timestamp and the second start frame timestamp, and a difference between the first end frame timestamp and the second end frame timestamp;
determine that the calculated skew value exceeds a skew threshold;
based on the determining, correct the first start frame timestamp and the first end frame timestamp of the received frame to correlate to the second start frame timestamp and the second end frame timestamp; and
provide the corrected frame for display.

19. The one or more computer storage hardware devices of claim 18, wherein the computer-executable instructions, upon execution by a processor, further cause the processor to at least:
receive frames of a second video stream from a second capture device;
timestamp the received frames of the second video stream;
combine the video stream with the second video stream; and
wherein the corrected frame is synchronized with a matching frame of the second video stream.

20. The one or more computer storage hardware devices of claim 19, wherein the video stream is a visible light-based video stream and the second video stream is a depth camera-based video stream; and wherein combining the video stream with the second video stream creates a three-dimensional correlated video stream.

\* \* \* \* \*